United States Patent [11] 3,633,677

| [72] | Inventor | William Bruce Walker |
| | | Los Gatos, Calif. |
| [21] | Appl. No. | 848,499 |
| [22] | Filed | Aug. 8, 1969 |
| [45] | Patented | Jan. 11, 1972 |
| [73] | Assignee | FMC Corporation |
| | | San Jose, Calif. |

[54] TOMATO HARVESTER WITH SINUOUS OSCILLATING SHAKER
4 Claims, 16 Drawing Figs.

[52] U.S. Cl.................................................. 171/27, 171/14
[51] Int. Cl. ............................................. A01d 17/08
[50] Field of Search........................................ 171/27, 14, 133; 209/310

[56] References Cited
UNITED STATES PATENTS

| 1,958,322 | 5/1934 | Symington.................. | 209/310 |
| 2,711,742 | 6/1955 | Lavers......................... | 171/27 |
| 3,301,331 | 1/1967 | Looker et al. ............... | 171/27 |

*Primary Examiner*—Antonio F. Guida
*Attorneys*—F. W. Anderson and C. E. Tripp

ABSTRACT: A tomato harvester feeds a mass of vines and tomatoes to a shaker conveyor wherein the mass is oscillated by a shaker bar and bellcrank assembly in the direction of conveyor travel as well as normal to said direction, to shake the tomatoes loose along a sinuous path. The shaker conveyor is in two sections joined by an oscillating cascade structure.

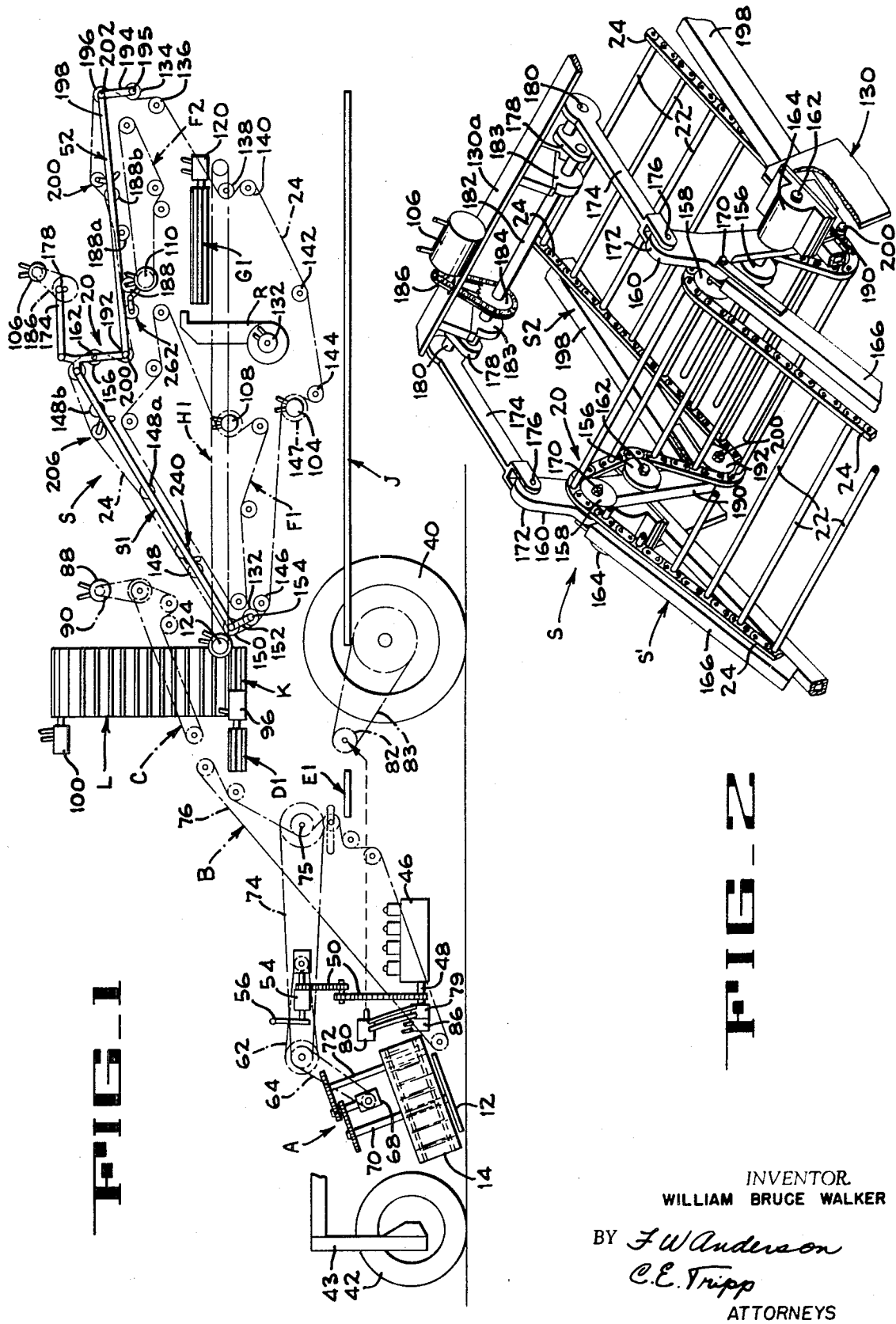

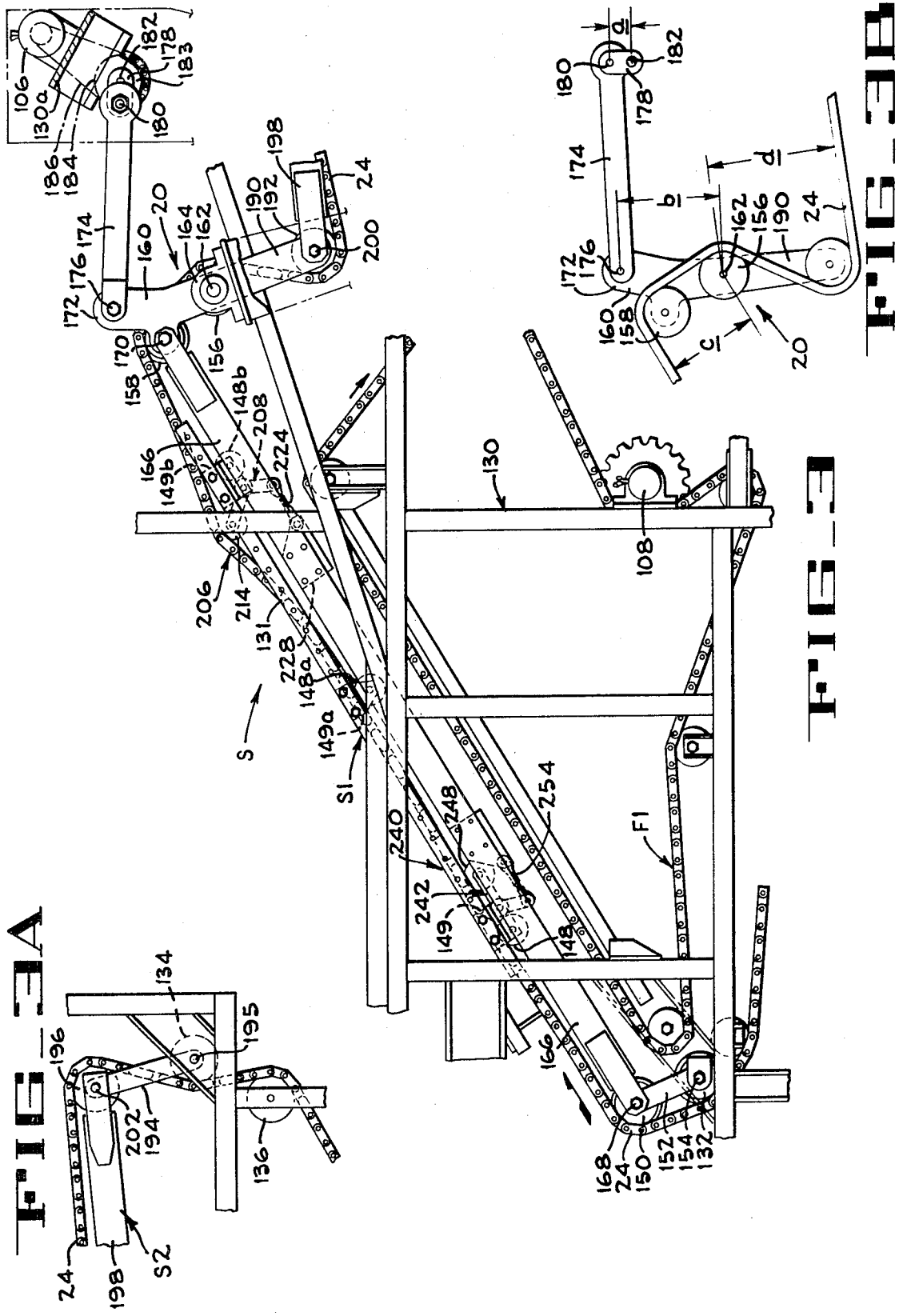

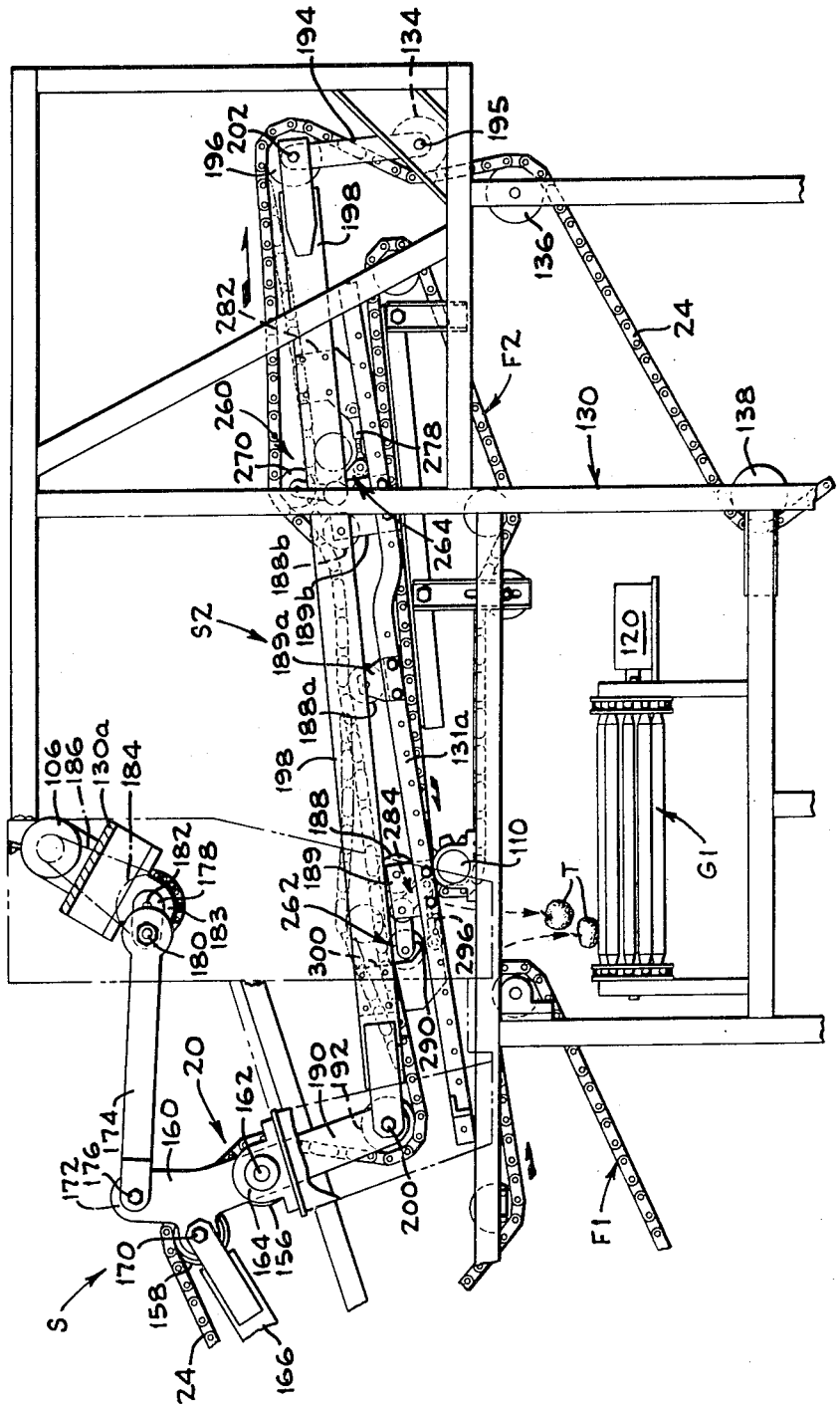

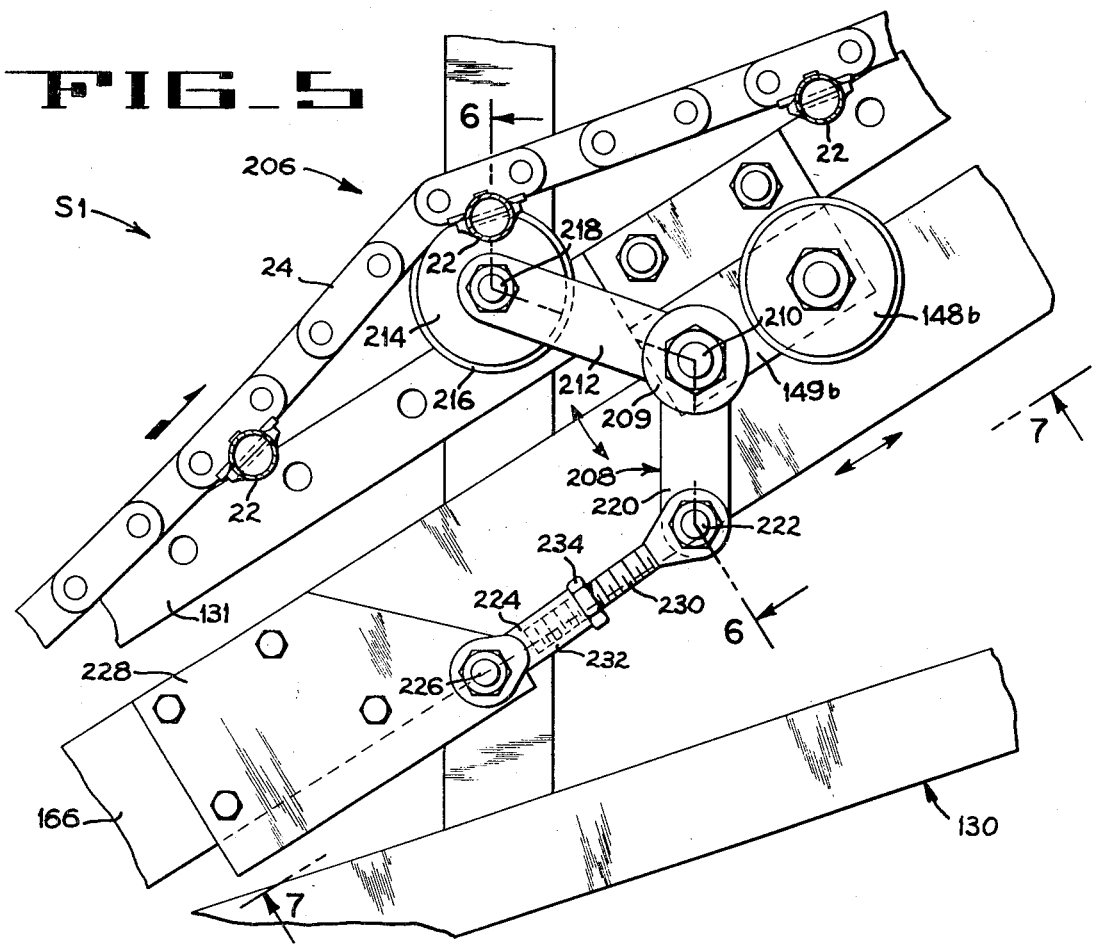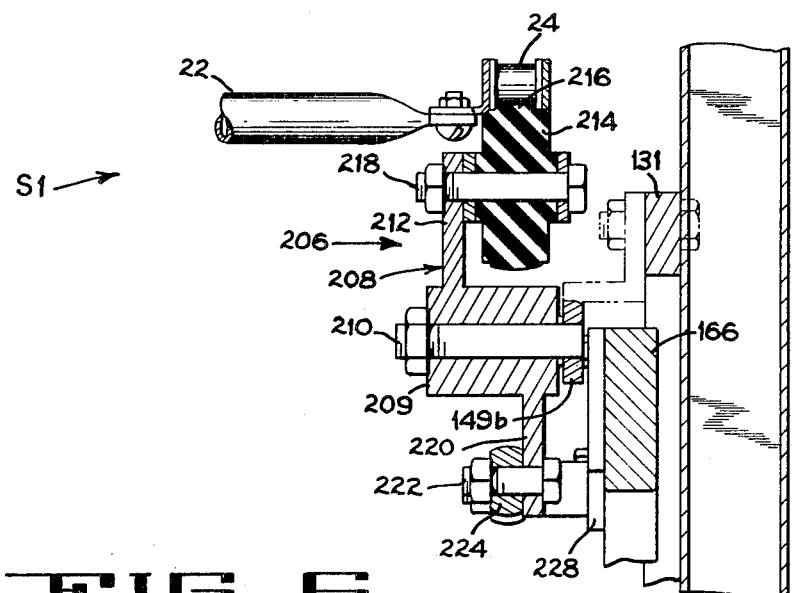

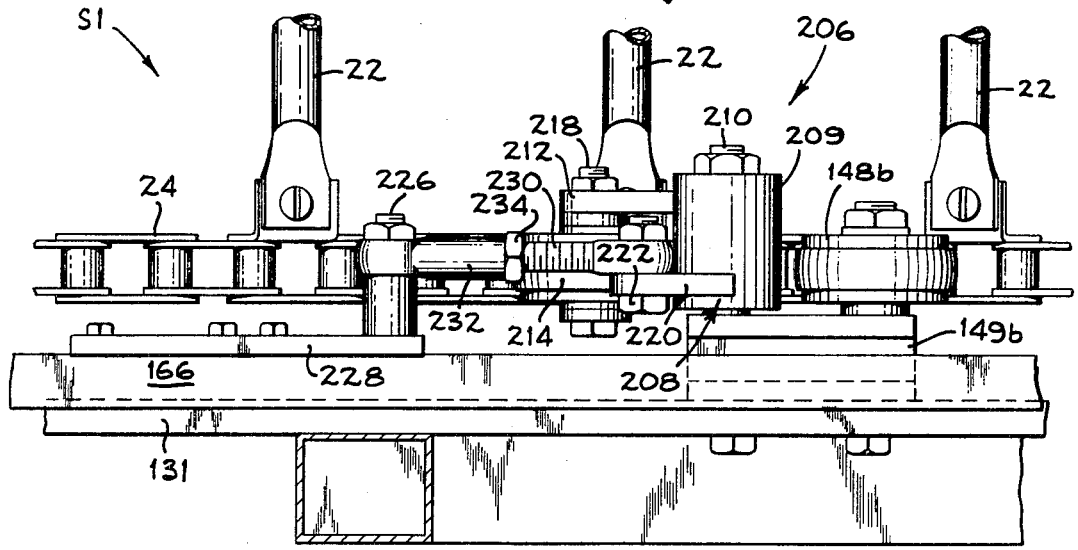
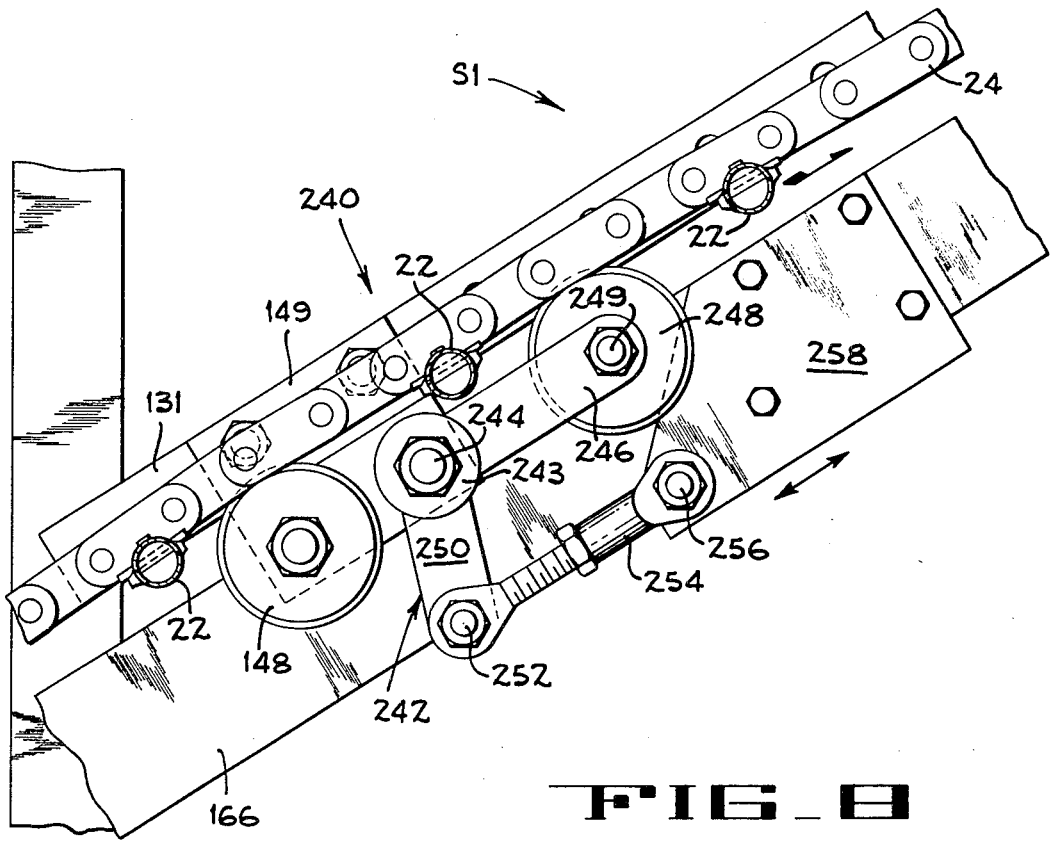

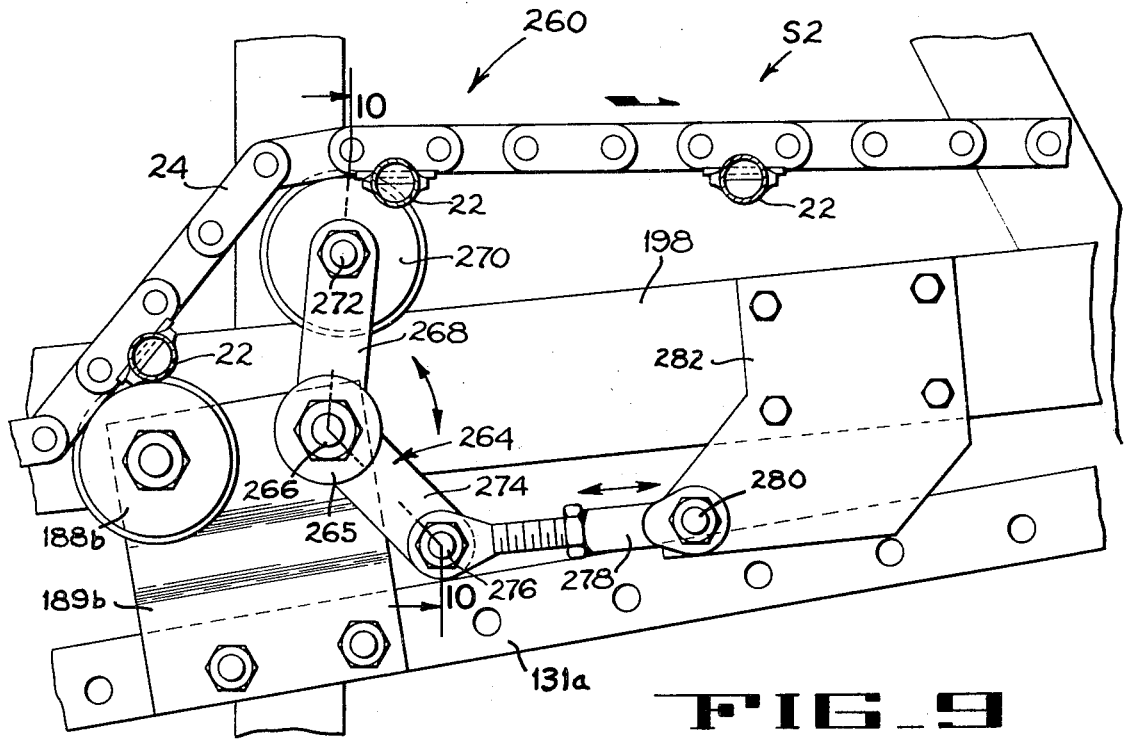
FIG_9
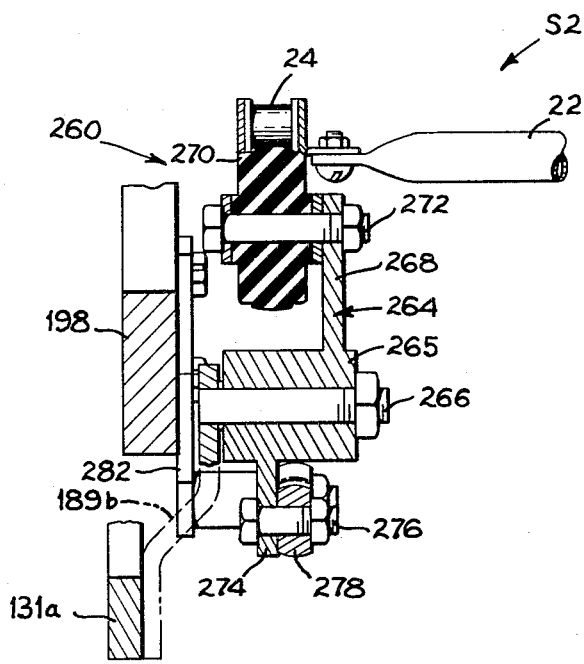
FIG_10

FIG_11
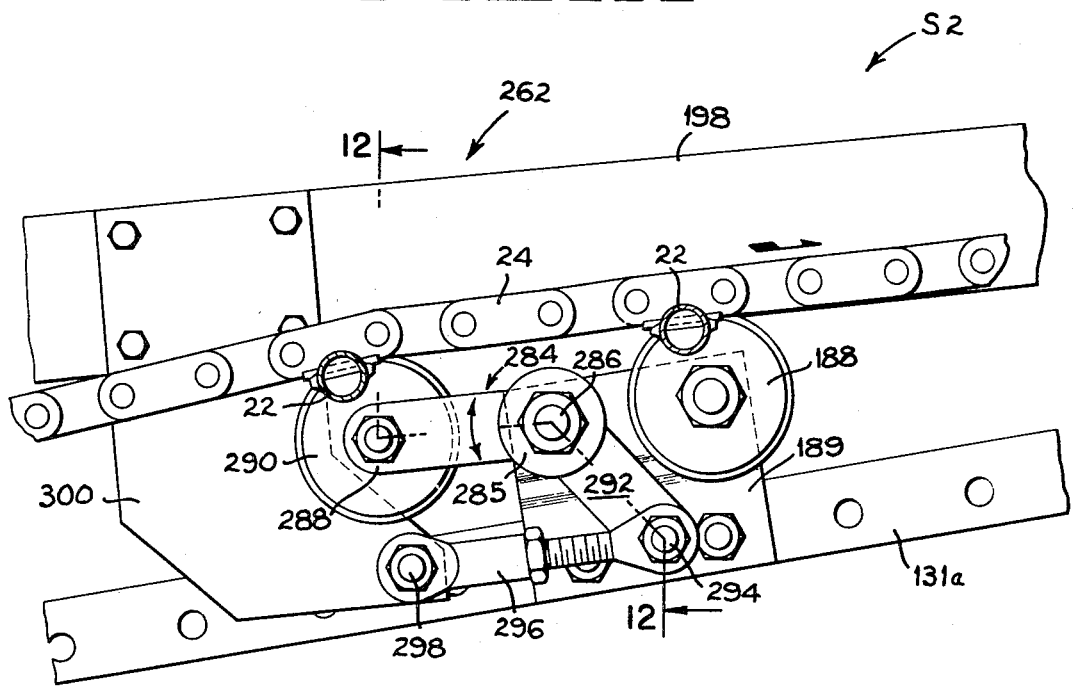
FIG_12
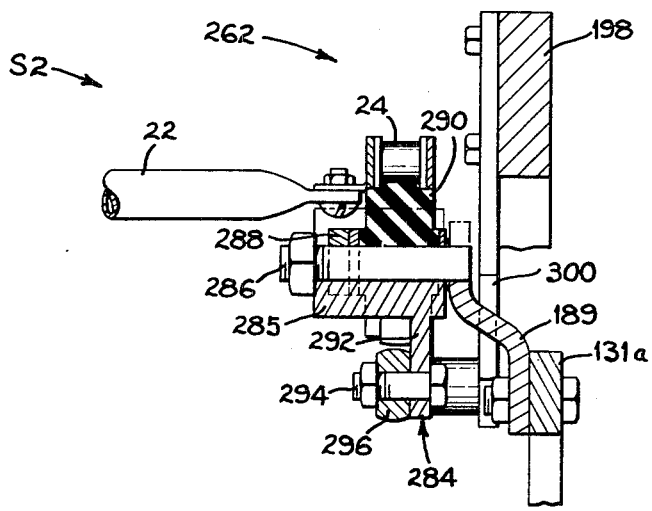

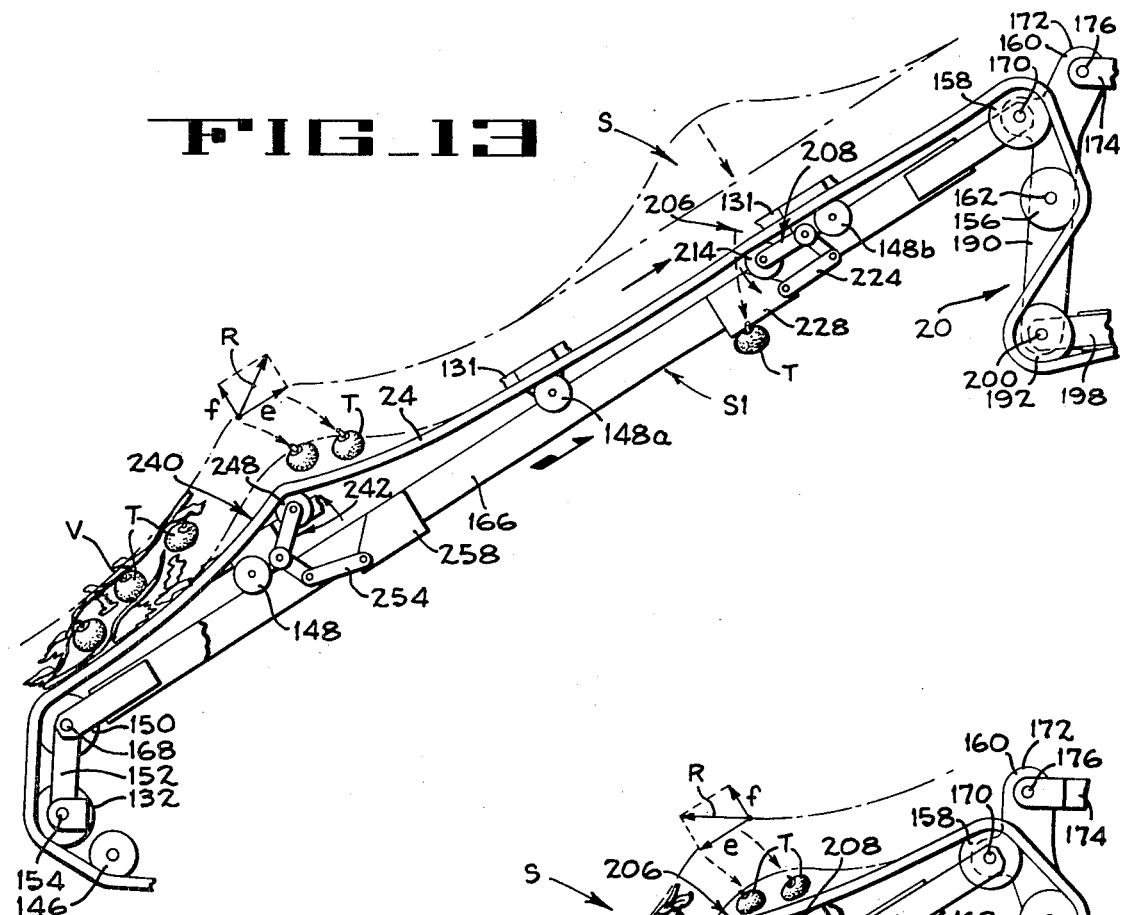
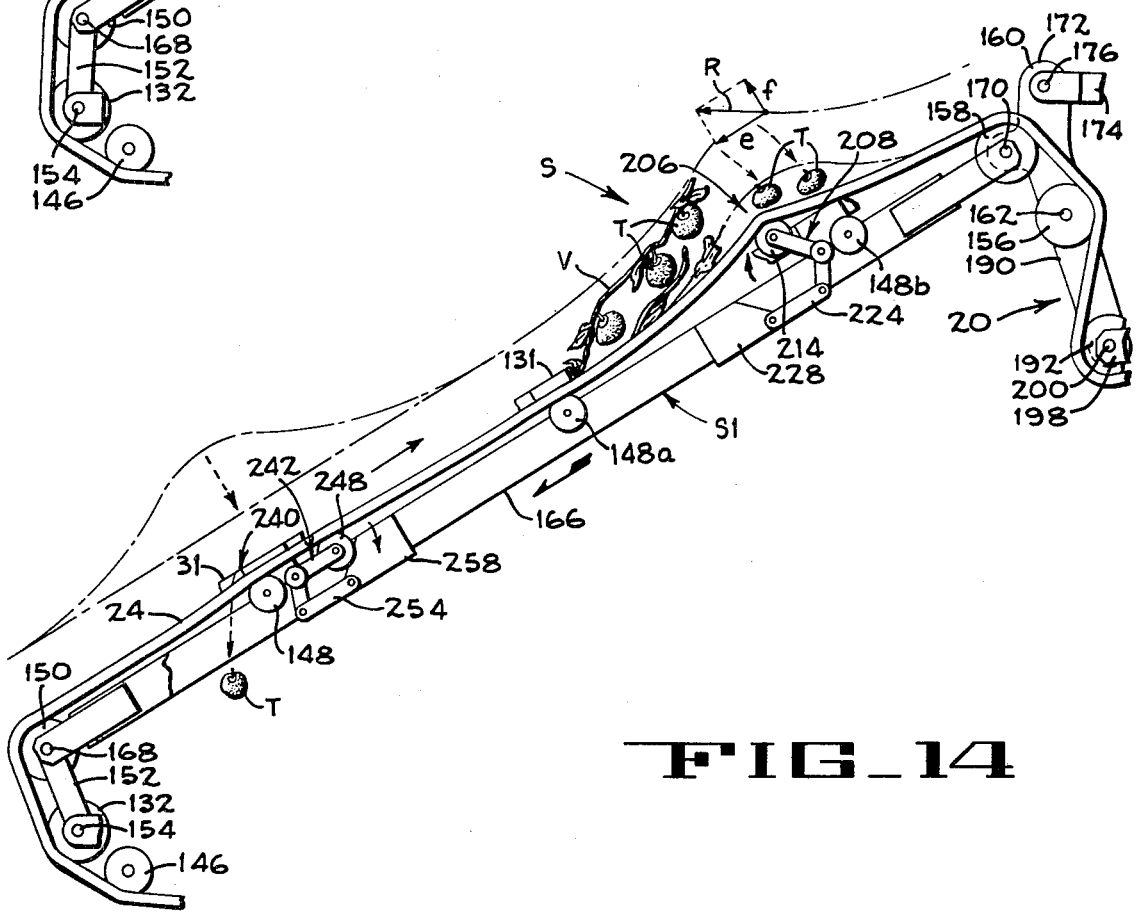

TOMATO HARVESTER WITH SINUOUS OSCILLATING SHAKER

SUMMARY OF THE INVENTION

Prior tomato harvesters such as that of U.S. Pat. to Scheidenhelm No. 3,071,196, Jan. 1, 1963, FIG. 8 and U.S. Pat. to Looker et al., No. 3,301,331, Jan. 31, 1967, FIG. 5, employ a shaker mechanism wherein the shaker chain is linearly oscillated in the plane of conveyor travel by means of oscillating pulleys mounted on supporting links and connected by a shaker bar. Under the present invention, a fluffing and disentangling operation is preformed at a shaker mechanism of this type by imparting a sinuous motion to the upper reach of the shaker chains. The sinuous motion is imparted without stretching or unduly wearing the chains by oppositely reciprocating bellcrank and pulley mechanisms that are vertically oscillated by direct connection to the shaker bar that performs the aforesaid linear oscillations in the plane of shaker chain travel. Although the vertical oscillation of a travelling shaker chains is, in itself known, as shown by U.S. Pat. to Klinghammer, No. 1,107,965, Aug. 18, 1914; Lavers, No. 2,711,742, June 28, 1955 and Zachary, No. 3,106,249, Oct. 8, 1963, it has not been recognized that the action of shaker mechanism such as that of Scheidenhelm and Looker et al. previously referred to can be enhanced without undue chain wear and a tendency to stretch the chain by superposed vertical oscillations which provide a sinuous oscillating motion to the conveyor chain as previously described. As a result of the superposed motions characteristic of the present invention, tomatoes which were formerly embedded in the mass of vines that were being carried along the shaker are disentangled and dropped from the vines onto the shaker bars, thereby insuring their removal from the mass before the vines are returned to the field from the rear of a shaker conveyor.

BRIEF DESCRIPTION OF THE DRAWINGS

FIG. 1 is a diagrammatic side elevation of a tomato harvester embodying the present invention showing the various driving mechanisms.

FIG. 2 is a fragmentary schematic perspective of the tomato harvester showing the various conveyors and other elements.

FIG. 3 is an enlarged fragmentary side elevation showing the first shaker section and the oscillating mechanism for both shaker sections.

FIG. 3A is a view of the discharge end of the second shaker section.

FIG. 3B is a diagram showing certain dimensions of the oscillating mechanism for the shakers.

FIG. 4 is a view like that of FIG. 3 showing the second shaker section.

FIG. 5 is an enlarged fragmentary view of the rearward vertical oscillating mechanism at the first shaker section.

FIG. 6 is a section taken on line 6—6 of FIG. 5.

FIG. 7 is a view looking along line 7—7 of FIG. 5.

FIG. 8 is a view corresponding to that of FIG. 5 showing the front vertical oscillating mechanism of the first shaker section.

FIG. 9 is a fragmentary side view of the rear vertical oscillating mechanism of the second shaker section.

FIG. 10 is a section taken along 10—10 of FIG. 9.

FIG. 11 is a side view like that of FIG. 9 showing the front vertical oscillating mechanism of the second shaker section.

FIG. 12 is a section taken on line 12—12 of FIG. 11.

FIG. 13 and 14 are operational diagrams showing operation of the front shaker section.

GENERAL HARVESTER DESCRIPTION

The tomato harvester of this invention represents an improvement in the tomato harvesters described in the U.S. Pat. to Looker et al. No. 3,301,331, issued Jan. 31, 1967, in the U.S. Pat. of Csimma, No. 3,340,935, issued Sept. 12, 1967, in the U.S. application of Boyce, Ser. No. 633,937, filed Apr. 26, 1967 now U.S. Pat. No. 3,473,613, issued Oct. 21, 1969, and in the U.S. application of Link et al., Ser. No. 767,736, filed Oct. 15, 1968 now U.S. Pat. No. 3,566,881, issued Mar. 2, 1971, all assigned to the assignee of the present invention. The invention will be described as installed on a tomato harvester such as that of Link et al.

In these machines, vines bearing attached tomatoes are cut off and deposited on a feeder conveyor, along with loose tomatoes, loose dirt and clods of dirt. The loose tomatoes and clods drop from the feeder conveyor onto dirt belts from which the loose tomatoes are manually removed upstream of a shaker. The vines and attached tomatoes continue onto a shaker, which detaches tomatoes from the vines.

The general arrangement of the frame structure, the wheels and their mounting, the construction and mounting of the cutting discs and the undulating side delivery belts, as well as mechanical drive elements for these parts as well and the feeder conveyor are all described in detail in the copending U.S. application of Manfre, Ser. No. 527,827 filed Aug. 15, 1966 now U.S. Pat. No. 3,469,383, issued Sept. 30, 1969 and in the Greedy U.S. Pat. No. 3,330,363, issued July 11, 1967, also assigned to the assignee of the present invention. The nature of these mechanical details is not essential to the present invention and hence will not be described in detail in this specification. Other well-known crop pickup and feeding assemblies can be used in conjunction with the sinuous motion shaker conveyor feature of the present invention.

The basic units of a tomato harvester embodying the present invention will now be briefly described. As the harvester moves down the field, the pickup assembly A, FIG. 1, serves growing vines and picks them up, along with their attached tomatoes, as well as loose tomatoes lying on the ground. The pickup assembly illustrated is described in more detail and claimed in the aforementioned patent of Greedy. It includes a pair of rotating, notched cutting wheels 12 (FIG. 1) which are normally set so that their leading edges scrape along beneath the surface of the ground. The crop thus picked up is advanced rearwardly by a pair of undulating side belts 14 shown in FIG. 1, it being understood that the details of the pickup mechanism are not critical to the invention.

The mass of vines with attached tomatoes, loose tomatoes, and incidental dirt, is advanced onto a feeder conveyor B which is formed of closely spaced slats connected at their ends to side chains. The vines and their attached tomatoes are carried over from the feeder conveyor B to a transfer conveyor C. This is a beltlike member driven by side chains.

The loose tomatoes and most clods of dirt do not reach the transfer conveyor C; they drop off over the end of the feeder conveyor B, and fall onto a transversely running loose material conveyor system D1, sometimes referred to as the "dirt belt." Thus the loose tomatoes, which are usually the ripest tomatoes, leave the mass of vines and vine-attached tomatoes before the latter reach the shaking device, as described and claimed in the aforesaid U. S. Pat. to Looker et al. No. 3,301,331.

Running laterally behind the dirt belts is a combined, transversely running collector conveyor K and a loading conveyor L, in the form of a single endless conveyor. These conveyors receive and load both loose and vine-detached tomatoes into a truck.

Front sorting platforms E1 are positioned alongside of the loose material or dirt belt system D1, so that sorting operators can select the good loose tomatoes on the belt system D1 and transfer them manually to the collecting conveyor K, leaving the cull loose tomatoes and the clods to run off the ends of the dirt belt system D1.

As mentioned, the vines and the vine-attached tomatoes bridge the gap between the feeder conveyor B and the transfer conveyor C and are conveyed along the transfer conveyor C, which drops them onto the improved shaker assembly S of the present invention. The shaker assembly S is a chain-driven slat conveyor which comprises two sections S1 and S2 that oscillate independently in the plane of conveying motion, with a connecting drop off or cascade section 20 for tumbling and fluffing the mass. The shaker S includes slats 22 (FIG. 2) connected to driving side chains 24 and hence provides an open platform which supports the vines and attached tomatoes but permits detached tomatoes to fall through.

Tomatoes detached from the vines by the first oscillating shaker section S1 drop between the slats 22 and onto an undershaker conveyor F1 (FIG. 1).

After passing over the cascade section 20, tomatoes still attached to their vines are shaken loose by the second oscillating shaker section S2, and fall onto a second undershaker conveyor F2.

The undershaker conveyors F1 and F2 deliver detached tomatoes from the respective shaker section S1 and S2 to oppositely running, rear collecting cross conveyors, the near side cross conveyor G1 appearing in FIG. 1. The details of this collection system are not essential to the present invention, but are explained in the aforesaid prior applications and patents. The stripped vines run off the rear end of shaker section S2 and out of the rear of the machine.

In order to present the vine-detached tomatoes for inspection by side culling operators, longitudinal side sort conveyors such as the near side conveyor H1, receive tomatoes from the rear collecting conveyor system G1. Culling operators on side platforms J (only one platform being shown in FIG. 1) throw off the cull tomatoes, leaving the good tomatoes on the side sort conveyors H1 and that on the other side, not shown. The culling operators can also throw off clods of dirt, vine fragments and other trash reaching the side sort conveyors.

As mentioned, the detached and sorted tomatoes on the side sort conveyors H1, etc., are combined with the loose tomatoes removed from the dirt belt system D1, on the collecting conveyor K, and are carried via the elevator conveyor section L into bins or trucks as market tomatoes.

As seen in FIG. 1, a blower R is provided for blowing vines and trash clear of the rear collecting conveyors G1, although this blower is not a feature of the present invention.

General Mechanical Details

Before describing in detail the improved association of shaker elements of the present invention, reference will now be made to the various drive mechanisms, although these details are not essential to the present invention. In the exemplary machine illustrated herein, rear drive wheels 40 (FIG. 1) drive the harvester along the ground at about 50–90 feet per minute, as described in the previously mentioned Csimma patent. The front steering wheel 42 is mounted on a vertically adjustable mounting frame 43, for selecting the height of the pickup mechanism A above the ground, as shown in the aforesaid United States patent to Greedy.

The notched vine cutting wheels 12 are mechanically driven at a peripheral speed of approximately 250 feet per minute, in a manner to be briefly mentioned presently. The undulating side belts 14 (only one appears in FIG. 1) are driven at a linear speed of approximately 70 feet per minute, in the example herein given.

Front End Drives

The harvester is powered by an internal combustion engine 46 (FIG. 1) having an output shaft 48 which operates a sprocket chain drive 50 for a clutch 54. The clutch is engaged by a manual lever 56 to cut in the front end mechanism. The clutch 54 drives a sprocket chain drive mechanism 62, 64 and a right-angle gearbox 68 for a chain drive to the shafts 70 of the cutters 12. The gearbox 68 also chain drives shafts 72 for the side belts 14, as is fully disclosed in the Csimma patent.

In order to drive the feeder conveyor B, a sprocket chain drive 74 (FIG. 1) is driven from the chain drive 62, and turns a countershaft 75 which drives sprockets that engage the side chains 76 of the conveyor. The chains are trained around entry and exit sprocket shaft assemblies and various idlers. The drives are such that when the harvester is operated along the ground at a linear speed of about 70 feet per minute, the feeder conveyor B will be operated at a linear speed of about 72 feet per minute.

The drive wheels 40 are hydraulically driven. A hydraulic pump 79, operated by the engine shaft 48, is connected to a hydraulic system indicated schematically by two pipes connected to a hydraulic motor 80. Through gearing, not shown, the hydraulic motor 80 turns jackshaft sprockets 82 which sprockets may be driven through differential gearing, not shown, on their shaft. Sprockets 82, by means of a sprocket chain drive 83, turn the rear wheels 40 individually.

Hydraulic Material Handling Drives

The material handling drives now to be described are operated by hydraulic motors in a hydraulic system. Details of the hydraulic system for driving the various conveyors herein disclosed are not, in and of themselves, essential to the invention and conventional hydraulic engineering design is employed.

As seen in FIG. 1, a second hydraulic pump 86 is operated from the engine shaft 48, and supplies oil under pressure for driving the various hydraulic motors to be mentioned. The transfer conveyor C is driven by a hydraulic motor 88 through a chain and sprocket drive 90, for driving the side chains of the conveyor. The transfer conveyor C is operated, in the example being given, at a linear speed of approximately 75 to 80 feet per minute.

The loose material conveyors or dirt belt system D1 is driven directly by hydraulic motors 96, one of which, is shown. These motors drive the side chains of these conveyors at a linear speed adequate to dispose of their load and accommodate sorting.

The combined collector and tomato delivery conveyors K, L are driven by a hydraulic motor 100 at the delivery end of the conveyor, driving sprockets which engage the conveyor side chains. The collector conveyor is driven at a linear speed high enough to deliver the tomatoes it receives.

The shaker conveyor side chains 24 are driven by a hydraulic motor 104 at about 130–150 ft./min.

The shaker sections S1 and S2 are longitudinally oscillated at about 225–260 cycles/min. by a hydraulic motor 106 and associated linkage, described in detail and claimed in the aforesaid Link et al. application.

The side chains of the undershaker conveyors F1 and F2 are driven by hydraulic motors 108, 110 respectively. The conveyors are driven, in the example herein presented, at a linear speed adequate to carry away their load.

The rear transverse collecting conveyors G1, and the one not shown in FIG. 1 are individually driven in opposite directions by hydraulic motors 120, and a motor not shown and at a linear speed adequate to carry away their load.

The longitudinally running side sort conveyors H1 is driven by a hydraulic motor 124, and at a linear speed adequate to handle the fruit for sorting. The side sort conveyor on the other side of the harvester (not shown) is similarly driven.

The blower R is driven directly by a hydraulic motor 132, FIG. 1.

Shaker Chain Mounting

In the illustrated embodiment of the present invention, the shaker S is a cascade shaker having front and rear sections S1 and S2, and these sections are linearly oscillated in the plane of their conveying motion. Superimposed upon this linear oscillation of the shaker chains and their flights are vertical oscillations which cooperate with the linear oscillators to impart a sinuous motion to each shaker section. The apparatus shown for imparting the linear oscillations to the front and rear shaker sections is like that of the aforesaid Link et al. pending application, but for convenience it will be briefly described here, before presentation of a detailed description of the apparatus for imparting vertical motion to the shaker sections.

Referring to FIGS. 3 and 4, portions of the shaker frame 130 are shown which support the shaker and associated elements. The nature of the framework is not critical to the present invention, but rather represents simple engineering practice and all the structural details thereof will not be described.

At the front shaker section S1 (FIG. 3) the conveying reach is supported by laterally spaced, longitudinal bars 131, which bars are supported on upright frame elements. Similarly mounted bars 131a (FIG. 4) support the conveying reach of the rear shaker section S2.

The lower portion of the endless shaker conveyor is driven and includes various idler and direction-changing sprockets. It is to be understood that as indicated partially in FIG. 2, the idler pulls are paired, there being one for each chain 24, but for convenience, the sprockets and idlers at only one side of the conveyor are illustrated in FIGS. 1, 3 and 4. These remarks apply also to the shaker bars and mechanisms which are duplicated at each side of the conveyor, as also partially seen in FIG. 2, but with only one side appearing in FIGS. 1, 3 and 4.

The shaker conveyor chains 24 pass around front fixed idlers 132 (FIG. 3) and rear fixed idlers 134 (FIG. 4), these idlers also appear in FIG. 1. The conveyor also passes over a series of lower idlers or direction-changing sprockets 136 to 146 (FIG. 1) which cause the chain to encompass the undershaker conveyors F1, F2 as well as the cross conveyor G1 and the one not shown at the far side of the machine.

The shaker conveyor chains 24 are driven by driving sprockets 147 (FIG. 1) connected to the hydraulic motor 104 mentioned previously.

Shaker Section S1—Linear Oscillation

As mentioned and as seen in FIG. 3, the chains 24 forming the elevating and shaking portion of the shaker section S1 are normally supported on rollers 148, 148a and 148b suspended from inclined frame elements 131, although the chains are lifted from the front and rear rollers 148, 148b by the vertical oscillators, as will be described presently. The rollers 148 are suspended on brackets 149 (FIG. 8), the rollers 148a are on brackets 149a (FIG. 3) and the rollers 148b are on brackets 149b (FIGS. 5 and 7). The aforesaid brackets are secured to the associated bars 131.

The shaker section S1 includes front (product receiving) oscillating idlers 150 rotating on the free ends of idler follower arms 152, which arms are pivoted at 154 to the frame on the axes of the front fixed idlers 132 previously mentioned. The counterparts of the front fixed idlers 132 are intermediate fixed idlers 156, mounted on the frame at the cascade section 20 of the shaker. Rear oscillating idlers 158 for the section S1 are mounted on each side of the machine on the free ends of intermediate oscillating levers 160. The levers 160 are pivoted at 162 on the frame about the axes of the intermediate fixed idlers 156 just described. The pivots 162 are actually stub shafts mounted in bearing blocks 164 mounted on the frame, as seen in FIG. 2.

In order to cause the front and rear oscillating idlers 150, 158 to move together, the ends of long connecting links or shaker bars 166 are pivoted at 168 (FIG. 3) to the idler follower arms 152 and at 170 (FIGS. 2 and 3) to an intermediate portion of the oscillating levers 160. These end pivots for the shaker bars are on the axes of the oscillating idler pulleys 150, 158, respectively. Thus, oscillation of the intermediate levers 160 causes simultaneously oscillation of the idler follower arms 152 with consequent oscillation of the front and rear sets of oscillating pulleys 150, 158. This causes the conveying reach of the shaker conveyor section S1 to oscillate back and forth substantially linearly relative to the frame and in the plane of conveyor motion.

The intermediate levers 160 are oscillated by means of short, upwardly projecting extensions 172 connected to oscillating links 174 at pivots 176. The links 174 are reciprocated by cranks 178 (FIGS. 2 and 3) pivoted to the links 174 at 180. As seen in FIG. 2, the two cranks 178 are mounted on a crankshaft 182 supported in bearing blocks 183 suspended from a cross piece 130a of the frame assembly 130. Keyed to the crankshaft 182 is a drive sprocket 184 which is driven by a pinion and chain assembly 186 operated by the hydraulic motor 106 previously mentioned.

Shaker Section S2

The links for linearly oscillating the shaker section S2 are quite similar to those for the shaker section S1, and this section also includes provision for vertical oscillation of the shaker conveyor, as will be described presently. The conveyor reach which is oscillated has its side chains 24 normally supported on sets of rollers mounted on the frame, which rollers appear in FIG. 4. The roller set includes front rollers 188, intermediate rollers 188a and rear rollers 188b. These rollers are mounted on brackets 189, 189a and 189b, respectfully, projecting up from the longitudinally extending frame bars 131a.

The shaking section S2 is oscillated by downwardly projecting intermediate oscillating levers 190 which form extensions of the oscillating levers 160 for the section S1. The free ends of the levers 190 mount front oscillating pulleys 192, one at each side chain 24. The delivery end of the shaking section S2 also includes the rear fixed idler rollers 134, previously described, and rear oscillator following arms 194 are pivoted to the frame at 195 on the axes of the rollers 134 (FIG. 3A). The free ends of arms 194 mount rear oscillating pulleys 196. Rear oscillating arm connecting links or shaker bars 198 connect the oscillating lever extensions 190 to the rear following arms 194 by means of pivots 200 at the front oscillating pulleys 192, and pivots 202 at the follower levers 194 and associated pulleys 196.

Thus, it can be seen that when the oscillating cranks 178 are rotated by the crankshaft 182 (FIG. 1A) and the oscillating motor 106, the oscillating links 174 rock the intermediate oscillating lever portions 172, 190 about the pivots 162 (FIG. 3). This causes a longitudinal oscillation of the shaker section S1 in one direction (links 166, FIG. 3) and a simultaneously longitudinal vibration of the shaker section S2 in the other direction (links 198, FIG. 4). The cascade 20 provides an intermediate shaking and fluffing operation as described and claimed in the aforesaid Link et al. application.

The diagram of FIG. 3B shows typical dimensions of the preferred embodiment of the invention. The throw of the cranks 178 is indicated at "a" in FIG. 3B and in this embodiment of the invention, the throw is 2 inches, giving a 4-inch total stroke. The crank shaft 182 is rotated over a range of about 225–260 r.p.m. The distance "c" from the frame pivot 162 of the upper oscillating lever 160 and the tomato-supporting surface of the section S1 is about 9½ inches. The distance "b" between the frame pivot 162 of the lever 160 and the pivot 176 for the oscillating link 174 and the oscillating lever extension 172 is in this embodiment about 10½ inches, as is the distance "d" between the frame pivot 162 and the upper reach of the shaker section S2. These dimensions give a maximum velocity of oscillation of about 215–247 feet per minute, which is approximately 1½ times greater the linear velocity of the shaker conveyor chains 24, which velocity is about in the range of 130–150 feet per minute. The 4-inch crankshaft stroke gives a vertical shaking motion of about seven thirty-seconds inch, which augments the linear shaking actions in the path of tomato travel.

Vertical Oscillating Mechanism—First Shaker Section

As previously mentioned the front or first shaker section S1 and the rear or second shaker system S2 have superimposed on their linear oscillations, a set of vertical oscillations. The latter impart a sinuous motion to the shaker chains and associated shaker chains 24 and their flights 22. These vertical oscillations are imparted to the chains simultaneously but out of phase at each shaker section. In this manner, the sinuous motion is achieved and combined with the linear oscillations, but without any substantial wear on the chains and without requiring any appreciable followup motion by spring-loaded pickup pulleys or the like in the endless chain runs. As a result of this, the vertical motions imparted to the conveyor chains do not shorten the life of the chains and the chains do not longitudinally resist such motions.

FIGS. 5–7 show the vertical oscillating structure 206 at the rear of the first or front shaker section S1. This, and the other oscillating structures are in the form of bellcranks pivoted on the frame and with one leg of each bellcrank being connected to a shaker bar and the other leg carrying a pulley that supports and lifts the associated shaker chain. In the drawings, the bellcrank assembly at one side of the harvester only is shown, it being understood that a duplicate set will be associated with the shaker bars on the other side of the harvester.

The oscillating mechanism 206 includes a bellcrank lever 208 having a hub 209 that is pivoted at 210 to the same bracket 149b which was previously described as supporting the roller 148b. As seen in FIG. 5, the chain 24 is lifted from the roller 148b by the oscillating bellcrank 208, and includes outer leg 212 which pivotally supports a vertical chain oscillating roller 214 that has a central rib 216 (FIG. 6) for guiding the chain 24. The roller 214 is mounted on the leg 212 by means of a pivot bolt 218, as seen in FIG. 6. In order to raise and lower the chain-lifting roller 214, the bellcrank lever 208 has a lower leg 220 which connects by means of a pivot belt 222 to one end of an oscillating link 224. The other end of the oscillating link 224 connects by means of a pivot 226 to a bracket 228 secured to the main oscillating bar 166 previously described. The link 224 is made adjustable by forming it in two parts; namely, a threaded eye member 230 is received within a tapped socket member 232 for adjusting the length of the link and that adjustment can be locked by means of a locknut 234. As will be seen this construction is also characteristic of the vertical oscillating mechanisms at the other rollers to be described presently. The length adjustment just described for the link 224 makes possible precise positioning of the chain at the lower portion of its vertical stroke so that the chain can reestablish engagement with the pulley 148b (for example) and the oscillating mechanism under description.

The oscillating mechanism 240 for the forward portion of the conveyor section S1 will now be described relative to FIG. 8. The general construction and principle of the operation are the same as that of the vertical oscillator 206 just described, but the bellcrank lever in the mechanism 240 is reversed from that of mechanism 206 so that when the mechanism 206 raises the chain the mechanism of 240 lowers it, and vice versa.

Referring to FIG. 8, a bell crank 242 has a hub 243 that is pivotally mounted on a pivot bolt 244. The bolt 244 projects from the bracket 149 that mounts the chain-supporting pulley 148 previously described and which bracket is suspended from the frame structure 131 as is also previously explained. The bellcrank 242 has an outer leg 246 that mounts a chain raising and lowering pulley 248 like the pulley 214 shown in FIG. 6. The pulley 248 is mounted on the leg 246 by means of a pivot bolt 249. The inner leg 250 of the bellcrank 242 is pivoted by means of a pivot bolt 252 to an adjustable link 254, similar to the link 224 previously described in connection with FIG. 5. The other end of the link 254 is connected by a pivot bolt 256 to a bracket 258 secured to the linear oscillating link or shaker bar 166. The bar 166 is the same shaker bar that mounts the bracket 228 for the previously described oscillator mechanism shown in FIG. 5. The construction in plan of the mechanism shown in FIG. 8 is essentially the same as that for the mechanism of FIGS. 5 and 6 as shown in FIG. 7 and hence, a plan view of the mechanism of FIG. 8 is unnecessary.

The relation of the bellcrank levers 208 and 242 can be seen in FIG. 3, it being noted that the outer leg of the bellcrank mechanism 206 projects oppositely relative to the outer leg of the bellcrank mechanism of the bellcrank 242. Hence as the shaker bar 166 is oscillated by the linear oscillating mechanism, one bellcrank roller goes up and the other one goes down, as will be explained in more detail presently in conjunction with FIGS. 13 and 14.

Vertical Oscillators—Second Conveyor Section

As seen in FIG. 4, the second or rearward shaker conveyor, conveyor section S2 includes a rearward oscillating mechanism 260 and a front oscillating mechanism 262. These mechanisms cooperate to impart a sinuous motion to the conveyor chains 24 in accordance with the mode of operation of the oscillating mechanism 206, 240 previously described in connection with the front conveyor section S1. However, due to the cascade arrangement, the longitudinal shaker bars 166 (for the front section S1) and 198 (for the rear section S2) oscillate in opposite directions. Although the shaker bars move oppositely, the sinuous configuration of the conveyor shaker chains 24 continue over the entire length of the upper run in the shaker section S. Under the present invention, when the bellcrank of the vertical oscillating mechanism 240 of the first section S1 is lowered (FIG. 1) the bellcrank for the oscillating mechanism 206 of that section is raised. To continue the sinuous motion along the chain, this means that the bellcrank in the oscillating mechanism 262 for the rear section S2 will be lowered, and the bellcrank in the oscillating mechanism 260 for that section will be raised. Since the shaker bar 198 (FIG. 4) oscillates 180° out of phase with the shaker bar 166 (FIG. 3) and since the vertical oscillating mechanisms of the rear shaker section S2 should be in phase with their counterparts in the front shaker section S1, the bellcranks of the oscillator mechanisms for the two shaker sections are relatively reversed.

FIGS. 9 and 10 show details of the vertical oscillating mechanism 260 which is the rear oscillating mechanism for the second or rear shaker section S2. The bellcrank 264 for the oscillating mechanism 260 has a hub 265 that rotates on a pivot bolt 266 projecting from the bracket 189b previously referred to as supporting the roller 188b on the frame member 131a. The bellcrank 264 has an outer leg 268 which mounts a chain raising and lowering roller 270 contoured to receive chain 24, as seen in FIG. 10. The roller 270 is mounted on the leg 268 by a pivot bolt 272.

In order to raise and lower the roller 270 the bellcrank 264 has a lower leg 274 that is connected by means of a pivot bolt 276 to an adjustable link 278 like the corresponding links previously described. The link 278 is pivotally mounted at 280 to a bracket 282 that depends from the associated shaker bar 198. Thus, oscillation of the shaker bars 198 raises and lowers the pulleys 270 and hence the conveying reach of the shaker conveyor at the rear portion of the rear or second conveying section S2.

FIGS. 11 and 12 show the forward vertical oscillating mechanism 262 for the rear shaker section S2. In this mechanism the bellcrank lever 284 has a hub 285 that is mounted on a pivot bolt 286. The pivot bolt 286 projects from the bracket 189 that mounts the roller 188 previously described. The bellcrank lever 284 has an outer arm 288 that projects oppositely from the arm 268 of the bellcrank lever 264 (FIG. 9). The arm 288 mounts a contoured pulley 290 for raising and lowering the chain 24 in response to oscillation of the associated shaker bar 198. The bellcrank lever 284 has an inner leg 292 that is pivoted at 294 to an adjustable oscillating link 296. The link 296 is pivoted at 298 to a bracket 300 secured to and depending from the shaker bar 198. With the constructions just described, oscillation of the shaker bar 198 in one direction raises the pulley 270 of the oscillating structure 260 (FIG. 9) and lowers the pulley 290 of the oscillating structure 262 (FIG. 11) and vice versa. As seen in FIG. 1, this imparts the aforesaid sinuous motion to the chains 24 of the shaker section S2 which forms a continuation of the sinuous motion similarly imparted at the shaker section S1, all as previously mentioned.

Superposed Oscillating Motions

FIGS. 13 and 14 illustrate the superposed oscillating motions at the first shaker conveyor section S1. In FIG. 13, a mass of vines V embedded with tomatoes T is being advanced along the shaker conveyor by the chains 24 and their connecting flights 22 (not shown). The shaker bars 166 have been moved rearwardly by the central oscillating levers 160 at the cascade section 20, as previously described. The linkage associated with vertical oscillating assemblies 240 has moved the bellcranks 242 in a direction to raise the rollers 248 and hence lift the chain 24. This imparts a bouncing and fluffing motion to the mass of vines and tomatoes.

As illustrated in the vector diagram above the mass, the shaker bars impart a velocity "e" to the mass in the direction of conveyor travel, whereas the oscillating mechanisms 240 impart a velocity "f" that is normal to the velocity "e." This gives a resultant velocity by the arrow R at any one instant. As a result of this initial lifting and the dropping action that follows, the vines V are fluffed and the tomatoes T are shaken downwardly to free them from entwinement with the mass of vines V. This brings the tomatoes T closer to the shaker chains 24 and their flight bars so that the linear oscillation of the shaker along vector "e" imparted by the shaker bars 166, will cause the tomatoes T to pass between the conveyor flights and onto the under shaker conveyor for collection.

It will also be noted in FIG. 13 that at the rearward vertical oscillating mechanism 206, the roller 214 on the bellcrank 208 is retracted or lowered. Thus at this zone the chains 24 have moved down from under the mass and have permitted the mass to drop against the shaker flights. This action will further dislodge tomatoes T and insure that they are shaken loose from the shaker conveyor by the oscillating motion thereof along its path of travel. The fixed rollers 148b abruptly stop descent of the chains which further jars loose tomatoes.

FIG. 14 shows the section S1 one-half cycle later. Here the shaker bars 166 have been fully extended forwardly. The forward vertical oscillating mechanism 240 is now in a position wherein the bellcrank 242 and its roller 248 have been rapidly lowered thereby causing a mass of vines and tomatoes to drop onto the shaker flights, thereby increasing the effectiveness of the linear shaking action of the conveyor. Fixed roller 148 exerts a jarring action like that of roller 148b.

As is also seen in FIG. 14 the vertical oscillating mechanisms 206 at the rear of the section S1 is in its raised position wherein the roller 214 on the bellcrank 208 has lifted the chains and raised the mass. As seen in the vector diagram, the resultant R now opposes the direction of travel of the conveyor over its pulleys. This reversal in the linear component of the resultant R, coupled with the vertical component thereof accentuates the fluffing action and insures that the tomatoes will settle and be shaken down through the mass of vines, for effective and aggressive shaking at the shaker conveyor.

The manner in which the shaking section S2 cooperates with the shaking section S1 so that the entire path of the mass of vines along the section is in effect a continuous path, has been described previously. It has also been explained how this vertical motion of the chains by the bellcrank can be effected without stretching or tightening the chains and without increasing their normal wear. The shaking action of section S2 is like that illustrated in FIGS. 13 and 14 for section S1.

Although the best mode contemplated for carrying out the present invention has been herein shown and described, it will be apparent that modification and variation may be made without departing from what is regarded to be the subject matter of the invention.

What is claimed is:

1. A crop harvester for tomatoes or the like comprising means for picking up a mass of vines and fruit, an endless side chain shaker conveyor having cross flights for supporting the mass, means for oscillating the conveying reach of said shaker conveyor in the plane of conveying motion for detaching fruit from the mass and means for feeding said mass to said oscillating conveying reach; the improvement wherein said harvester includes means for imparting a sinuous motion to said oscillating conveying reach, said sinuous motion imparting means comprising end sets and intermediate sets of longitudinally spaced fixed supports for the side chains, vertically moving lifter roller sets adjacent the end sets of said supports, means for positively driving said lifting rollers so that one set of rollers lifts the chains from the adjacent supports as the other set of rollers drops the chains onto the adjacent supports, the amount of slack in the upper reaches of said chains being such that it is substantially all taken up by whichever lifting roller set is fully raised, for insuring that the chains are always lifted clear of one set of said supports.

2. A vine crop harvester for tomatoes or the like comprising means for picking up a mass of vines and fruit, an endless shaker conveyor having side chains and spaced flights for supporting the mass, shaker bars running longitudinally under the conveying reach of said side chains, means for oscillating said shaker bars substantially along the plane of said conveyor reach motion, harvester frame members adjacent front and rear portions of said shaker bars, bellcranks pivoted on said frame members, rollers on arms of said bellcranks for supporting said side chains and means connecting the other arms of said bell cranks to said shaker bars for raising and lowering said chains in response to oscillation of the shaker bars, the roller mounting arms of said bellcranks extending in opposite directions.

3. A ground crop harvester of the type comprising a mobile vehicle having means for picking up a mass of vines or the like with the crop, and endless shaker conveyor for receiving said mass, and means for longitudinally oscillating a reach of said conveyor for detaching the crop from the mass; the improvement comprising means for alternately oscillating longitudinally spaced portions of said conveyor reach in a vertical direction at the same frequency as that of said longitudinal oscillations for augmenting the effectiveness of the longitudinal oscillations.

4. The method of harvesting vine crops such as tomatoes or the like, comprising the steps of picking up a mass of vines and fruit, fluffing the mass and shaking fruit therefrom by advancing the mass while simultaneously oscillating the mass both longitudinally in the direction of advance and generally normally to said direction along a sinuous path, the longitudinal and normal oscillations being at the same frequency.

* * * * *